US011177856B2

(12) United States Patent
Mishra et al.

(10) Patent No.: US 11,177,856 B2
(45) Date of Patent: Nov. 16, 2021

(54) CROSSTALK AMELIORATION SYSTEMS AND METHODS IN A RADIO FREQUENCY FRONT END (RFFE) COMMUNICATION SYSTEM

(71) Applicant: QUALCOMM Incorporated, San Diego, CA (US)

(72) Inventors: Lalan Jee Mishra, San Diego, CA (US); Richard Dominic Wietfeldt, San Diego, CA (US); Soon-Seng Lau, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 16/780,509

(22) Filed: Feb. 3, 2020

(65) Prior Publication Data
US 2021/0242903 A1   Aug. 5, 2021

(51) Int. Cl.
| | | |
|---|---|---|
| H04W 4/00 | (2018.01) |
| H04B 3/487 | (2015.01) |
| H04B 3/06 | (2006.01) |
| H04L 27/00 | (2006.01) |

(52) U.S. Cl.
CPC .............. H04B 3/487 (2015.01); H04B 3/06 (2013.01); H04L 27/0002 (2013.01)

(58) Field of Classification Search
CPC ......... H04B 3/06; H04B 3/487; G06F 13/362; G06F 13/4247; H04L 12/40013; H04L 27/0002; H04W 84/20
See application file for complete search history.

(56) References Cited

U.S. PATENT DOCUMENTS

| | | | | |
|---|---|---|---|---|
| 6,981,204 B2 * | 12/2005 | Sakai | ...................... | G06F 11/14 |
| | | | | 714/700 |
| 8,775,714 B2 * | 7/2014 | Leitner | .................. | G06F 13/287 |
| | | | | 710/316 |
| 8,971,469 B2 * | 3/2015 | Imai | ..................... | G06F 13/4291 |
| | | | | 375/356 |
| 9,519,612 B2 * | 12/2016 | Hietala | ............... | G06F 13/4291 |
| 10,095,644 B2 * | 10/2018 | Nakamuta | .............. | H03K 5/135 |
| 10,277,213 B1 * | 4/2019 | Kimelman | ............. | H03K 19/21 |
| 2016/0314087 A1 * | 10/2016 | Poulsen | .............. | G06F 13/4282 |
| 2018/0074985 A1 * | 3/2018 | Mishra | ................ | G06F 13/4247 |
| 2019/0182078 A1 * | 6/2019 | Brisotto | .............. | H04L 25/4902 |
| 2020/0081859 A1 * | 3/2020 | Mishra | .................. | G06F 13/385 |

OTHER PUBLICATIONS

MIPI Alliance, MIPI® Alliance Specification for RF Front-End Control Interface, Version 1.10, 90 pages, Jul. 26, 2011.*

* cited by examiner

*Primary Examiner* — Frank Duong
(74) *Attorney, Agent, or Firm* — QUALCOMM Incorporated (57) ABSTRACT

Crosstalk amelioration systems and methods in a radio frequency front end (RFFE) communication system provide a host or master of an RFFE bus to monitor a weakly-driven data line in the RFFE bus while a clock line is actively providing a clock signal for trigger events at one or more slaves on the RFFE bus. If the host detects noise on the data line that looks like a sequence start condition (SSC) signal, the host further signals on the data line to negate the impact of the false SSC signal and thus avoid misinterpretation by the slaves.

22 Claims, 6 Drawing Sheets

CROSSTALK AMELIORATION SYSTEMS AND METHODS IN A RADIO FREQUENCY FRONT END (RFFE) COMMUNICATION SYSTEM

BACKGROUND

I. Field of the Disclosure

The technology of the disclosure relates generally to communication systems having a two-wire bus and particularly to techniques to ameliorate crosstalk from a clock wire in the two-wire bus.

II. Background

Mobile communication devices have become increasingly common in current society. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences.

Most such mobile communication devices have a suite of circuits coupled to one another by a bus to serve as a radio front end. The MIPI® Alliance has promulgated a standard to make devices associated with such radio front ends compatible. This standard is descriptively named the Radio Frequency Front End Control Interface (RFFE). The standard was initially released in July 2010 as v.1.00.00. Subsequently, RFFE has been updated to accommodate 5G communication requirements. In particular, RFFE 3.0 has introduced the concept of a Timed-Trigger that permits reduction in control latency. Slaves rely on a steady clock signal from the master to track trigger events even when there is no data being actively sent on a data line of an RFFE bus.

There may be occasions when the clock signal on a clock line of the RFFE bus impinges on the data line (i.e., crosstalk), creating noise thereon which appears to be a valid signal. Such misinterpretations of noise as valid signals may negatively impact performance or user experience. Thus, there should be a way to reduce the impact of such crosstalk events.

SUMMARY OF THE DISCLOSURE

Aspects disclosed in the detailed description include crosstalk amelioration systems and methods in a radio frequency front end (RFFE) communication system. In particular, exemplary aspects of the present disclosure provide a host or master of an RFFE bus to monitor a weakly-driven data line in the RFFE bus while a clock line is actively providing a clock signal for trigger events at one or more slaves on the RFFE bus. If the host detects noise on the data line that looks like a sequence start condition (SSC) signal, the host generates further signals on the data line to negate the impact of the false SSC signal and thus avoid misinterpretation by the slaves.

In this regard in one aspect, an integrated circuit (IC) is disclosed. The IC includes a data port that is coupled to a data line of a communication bus, a transceiver coupled to the data port, and a glitch monitoring circuit coupled to the transceiver. The glitch monitoring circuit is configured to detect noise on the data line, compare the detected noise to a predefined signal type, and, on the detected noise matching the predefined signal type, cause signals to be added to the data line causing the detected noise to appear as something other than the predefined signal type.

In another aspect, an IC is disclosed. The IC includes a means for coupling to a data line of a communication bus, a means for transmitting coupled to the means for coupling to the data line, and a glitch monitoring circuit coupled to the means for transmitting. The glitch monitoring circuit is configured to detect noise on the data line, compare the detected noise to a predefined signal type, and, on the detected noise matching the predefined signal type, cause signals to be added to the data line causing the detected noise to appear as something other than the predefined signal type.

In another aspect, a method for controlling a communication bus is disclosed. The method includes comparing a detected noise event to a clock phase, ignoring the detected noise event when the detected noise event occurs during a logical high clock phase, determining that the detected noise event ends within a logical low clock phase when the detected noise event occurs during the logical low clock phase, and generating a signal on a data line causing the detected noise event to appear as something other than a predefined signal type.

In another aspect, a mobile computing device is disclosed. The mobile computing device includes a plurality of slaves, a two-wire communication bus including a clock line and a data line, the two-wire communication bus coupled to each of the plurality of slaves, and a host comprising an IC. The IC includes a data port coupled to the data line of the two-wire communication bus, a transceiver coupled to the data port, and a glitch monitoring circuit coupled to the transceiver. The glitch monitoring circuit is configured to detect noise on the data line, compare the detected noise to a predefined signal type, and, on the detected noise matching the predefined signal type, cause signals to be added to the data line causing the detected noise to appear as something other than the predefined signal type.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include crosstalk amelioration systems and methods in a radio frequency front end (RFFE) communication system. In particular, exemplary aspects of the present disclosure provide a host or master of an RFFE bus to monitor a weakly-driven data line in the RFFE bus while a clock line is actively providing a clock signal for trigger events at one or more slaves on the RFFE bus. If the host detects noise on the data line that looks like a sequence start condition (SSC) signal, the host further generates signals on the data line to negate the impact of the false SSC signal and thus avoid misinterpretation by the slaves.

Exemplary aspects of the present disclosure are well suited for use in an RFFE system within a mobile terminal. However, other systems that use a two-wire bus (e.g., clock line and data line) may also benefit from the present disclosure, and the present disclosure is not limited to an RFFE system. Before discussing particular aspects of the present disclosure, an overview of a mobile computing device (sometimes referred to as a mobile terminal) is provided with reference to FIG. 1 so that the context of an RFFE system is understood. An overview of an RFFE system is provided with reference to FIG. 2. Exemplary problems with conventional systems are highlighted with reference to FIGS. 3 and 4. A discussion of exemplary aspects of the present disclosure begins below with reference to FIG. 5.

Figure 1:
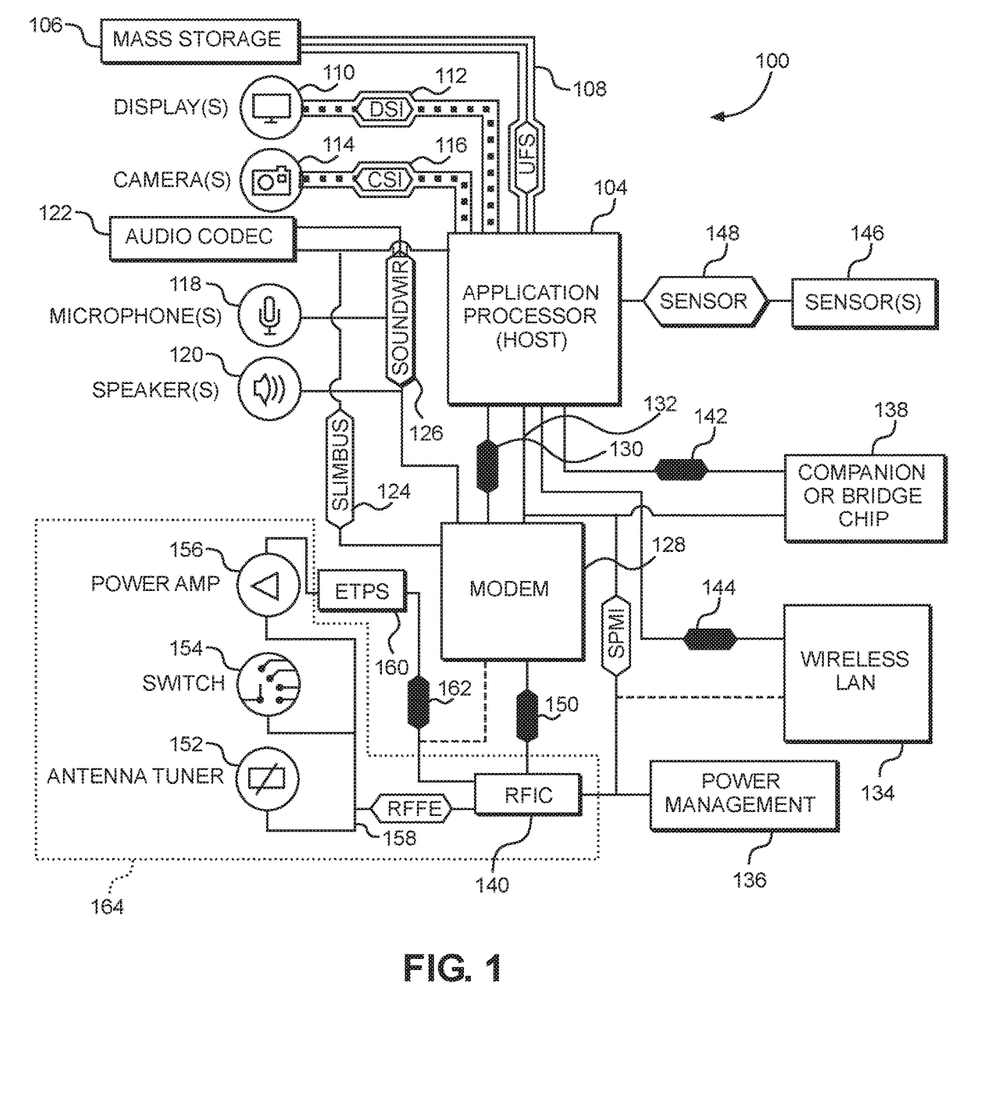
FIG. 1 is a block diagram of an exemplary wireless communication device having a radio frequency front end (RFFE) system with an RFFE bus.

In this regard, FIG. 1 is a system-level block diagram of an exemplary mobile terminal 100 such as a smart phone, mobile computing device, tablet, or the like. The mobile terminal 100 includes an application processor 104 (sometimes referred to as a host) that communicates with a mass storage element 106 through a universal flash storage (UFS) bus 108. The application processor 104 may further be connected to a display(s) 110 through a display serial interface (DSI) bus 112 and a camera(s) 114 through a camera serial interface (CSI) bus 116. Various audio elements such as a microphone(s) 118, a speaker(s) 120, and an audio codec 122 may be coupled to the application processor 104 through a serial low-power interchip multimedia bus (SLIMbus) 124. Additionally, the audio elements may communicate with each other through a SOUNDWIRE bus 126. A modem 128 may also be coupled to the SLIMbus 124 and/or the SOUNDWIRE bus 126. The modem 128 may further be connected to the application processor 104 through a peripheral component interconnect (PCI) or PCI express (PCIe) bus 130 and/or a system power management interface (SPMI) bus 132.

With continued reference to FIG. 1, the SPMI bus 132 may also be coupled to a wireless local area network (LAN or WLAN) integrated circuit (IC) (LAN IC or WLAN IC) 134, a power management integrated circuit (PMIC) 136, a companion IC (sometimes referred to as a bridge chip) 138, and a radio frequency IC (RFIC) 140. It should be appreciated that separate PCI buses 142 and 144 may also couple the application processor 104 to the companion IC 138 and the WLAN IC 134. The application processor 104 may further be connected to a sensor(s) 146 through a sensor bus 148. The modem 128 and the RFIC 140 may communicate using a bus 150.

With continued reference to FIG. 1, the RFIC 140 may couple to one or more RFFE elements, such as an antenna tuner 152, a switch 154, and a power amplifier 156 through an RFFE bus 158. Additionally, the RFIC 140 may couple to an envelope tracking power supply (ETPS) 160 through a bus 162, and the ETPS 160 may communicate with the power amplifier 156. Collectively, the RFFE elements, including the RFIC 140, may be considered an RFFE system 164. It should be appreciated that the RFFE bus 158 may be formed from a clock line and a data line (not illustrated).

It should be appreciated that typically the RFIC 140 is considered the master or host of the RFFE system 164 and particularly the master of the RFFE bus 158. In contrast, the antenna tuner 152, the switch 154, and the power amplifier 156 are typically considered to be slaves for the RFFE system 164 and the RFFE bus 158.

Figure 2:
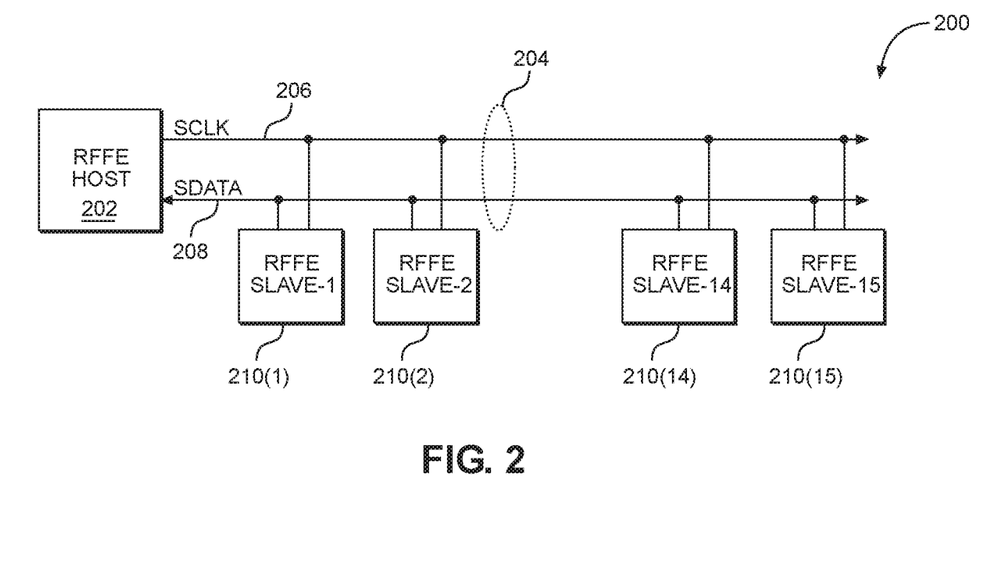
FIG. 2 is a block diagram of an RFFE system with a generic host and slaves showing a two-wire bus of the RFFE system.

An RFFE system 200 is illustrated in FIG. 2. In particular a host or master IC 202, which may be the RFIC 140 or the like, is coupled to an RFFE bus 204 that has a clock line 206 and a data line 208. The clock line 206 carries a clock signal SCLK and the data line 208 carries a data signal SDATA. The RFFE system 200 further includes up to fifteen (15) slaves 210(1)-210(15) (generically referred to herein as slave 210). A slave 210 may be a power amplifier (e.g., power amplifier 156 of FIG. 1), a switch (e.g., switch 154 of FIG. 1), an antenna tuner (e.g., antenna tuner 152 of FIG. 1), or the like.

Figure 3:
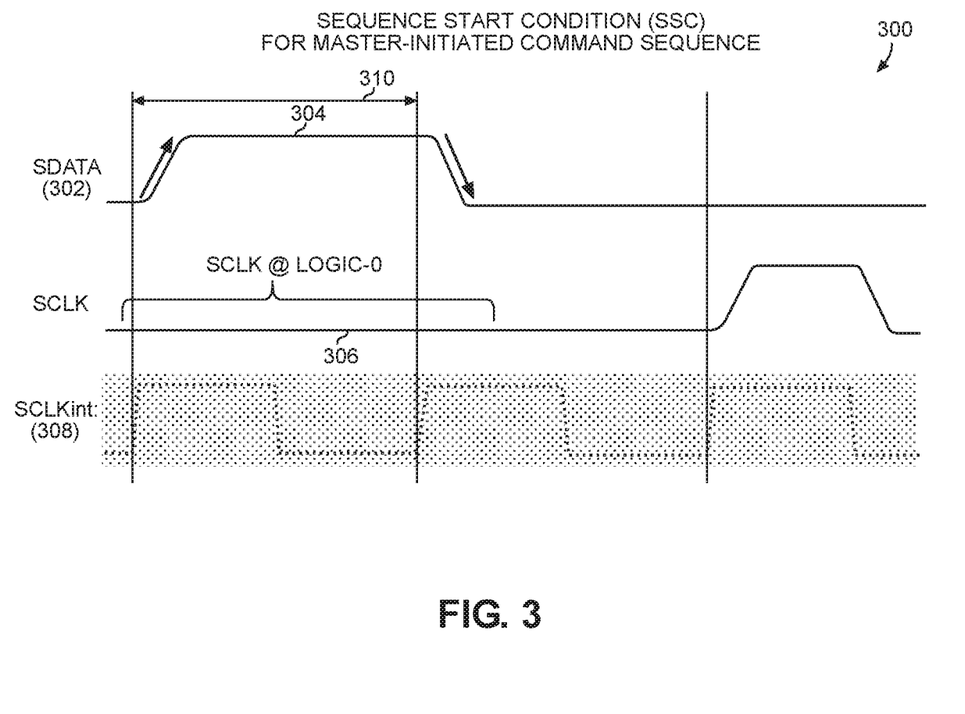
FIG. 3 is a timing diagram showing a conventional sequence start command (SSC) signal on a data line.

In normal operation, the host or master IC 202 may keep the clock line 206 and the data line 208 idle until there is data to send to a slave 210 or a command to send to a slave 210. At such time, the host or master IC 202 will generate an SSC signal by holding SCLK at a logical low (e.g., 0) while maintaining SDATA at a logical high (e.g., 1) for more than a complete clock cycle, as better illustrated in FIG. 3. In particular, FIG. 3 shows a timing diagram 300 where the top line 302 shows SDATA being raised to a logical high 304 while SCLK is maintained at a logical low 306. The third line 308 shows an internal clock SCLKint for the host or master IC 202 that is maintained even when there is no SCLK signal. As can be seen, SDATA is maintained at a logical high over a complete clock cycle 310. It should be appreciated that in many instances, slaves 210 in the RFFE system 200 will not have their own clock, so a given slave 210 may not have a reference to the SCLK when the SSC signal is sent. After a bus park cycle (BPC) where SDATA and SCLK are both at logical lows, anytime a slave 210 sees SDATA transitioning from low to high and from high to low while SCLK is low, the slave 210 may treat such transition as a valid SSC signal.

Figure 4:
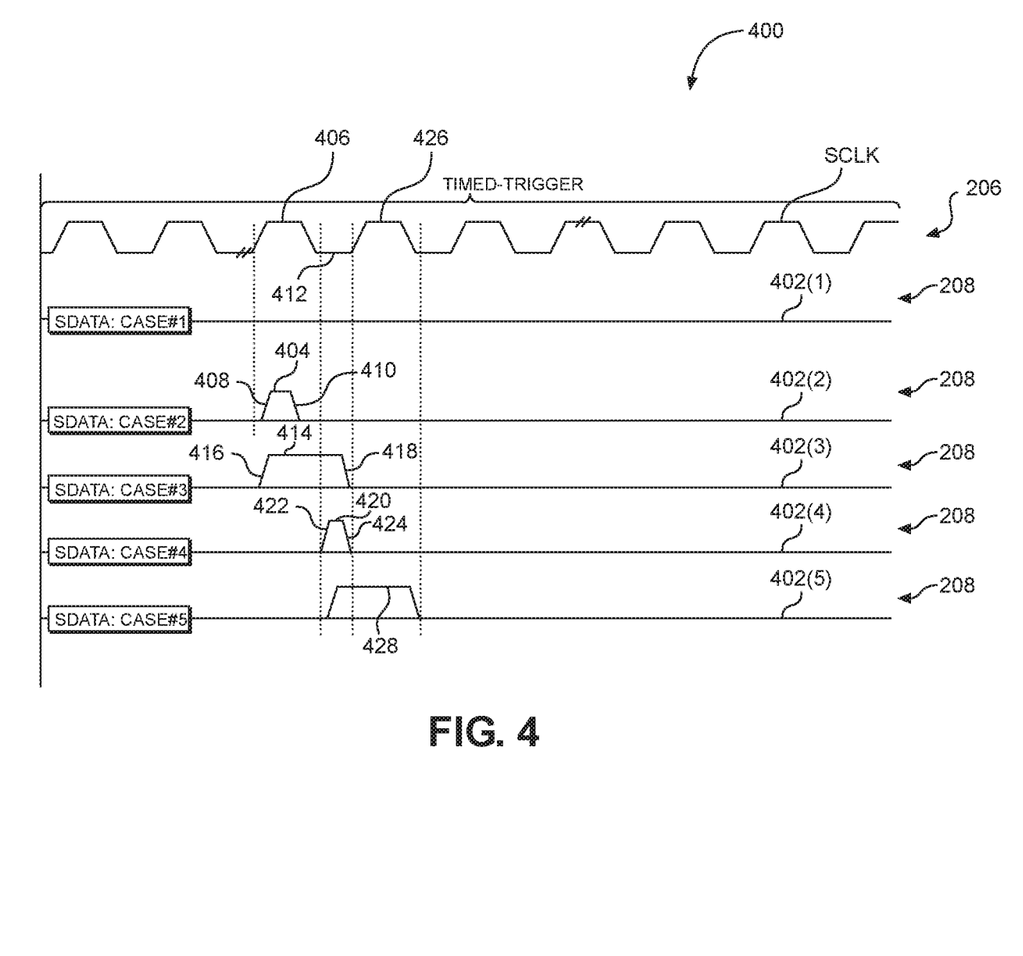
FIG. 4 is a timing diagram showing various ways a clock signal on a clock line may generate noise on a data line.

There may be instances when SCLK is being driven by the host or master IC 202 to provide a clock signal for a trigger event for one or more slaves 210. Normally, SDATA is weakly held at a logical low during such activity. Given the proximity of the clock line 206 to the data line 208 in FIG. 2, the data line 208 may experience crosstalk in the form of noise in SDATA which may look like a valid SSC signal. While noise from the clock line 206 is considered likely to be the primary source of such noise, there may be other aggressors in a mobile terminal that may also impinge on the data line 208 to create such noise. A variety of possible noise situations are illustrated in FIG. 4. Particularly, FIG. 4 illustrates a timing diagram 400 that has SCLK operating on the clock line 206 with lines 402(1)-402(5) representing possible noise cases. On line 402(1), the data line 208 experiences no noise, so SDATA remains flat at a logical low so there is no confusion or glitch.

With continued reference to FIG. 4, the line 402(2) has a noise event 404 that occurs while SCLK is at a logical high 406. That is, the noise event 404 rises 408 and falls 410 before the logical high 406 ends and SCLK returns to logical low 412. Because the logical high in SDATA occurs when there is also a logical high in SCLK, the slaves do not interpret the noise event 404 as an SSC signal.

With continued reference to FIG. 4, line 402(3) has a noise event 414 that begins 416 while SCLK is at the logical high 406. Unlike the noise event 404, the noise event 414 ends 418 while SCLK is at the logical low 412. However, because the noise event 414 occurs at least in part while there is also a logical high in SCLK, the slaves do not interpret the noise event 414 as an SSC signal.

With continued reference to FIG. 4, line 402(4) has a noise event 420 that occurs completely while SCLK is at the logical low 412. That is, rising edge 422 starts after the logical low 412 starts and falling edge 424 ends before the logical low 412 begins transition to a subsequent logical high 426. In this case, the noise event 420 looks like an SSC signal and subsequent signals (noise or otherwise) on the data line 208 may be interpreted incorrectly.

With continued reference to FIG. 4, line 402(5) has a noise event 428 may begin while SCLK is at the logical low 412, but continues into the logical high 426. As such, the noise event 428 will not be interpreted as an SSC signal.

Exemplary aspects of the present disclosure add a glitch monitoring circuit to the host or master IC 202 of the RFFE system 200 that detects noise events, and if a noise event comparable to the noise event 420 occurs, causes the host to take remedial action so that the slaves do not treat such a glitch as an SSC signal. An exemplary block diagram of a host is provided in FIG. 5 and an associated process is described with reference to FIG. 6 below.

Figure 5:
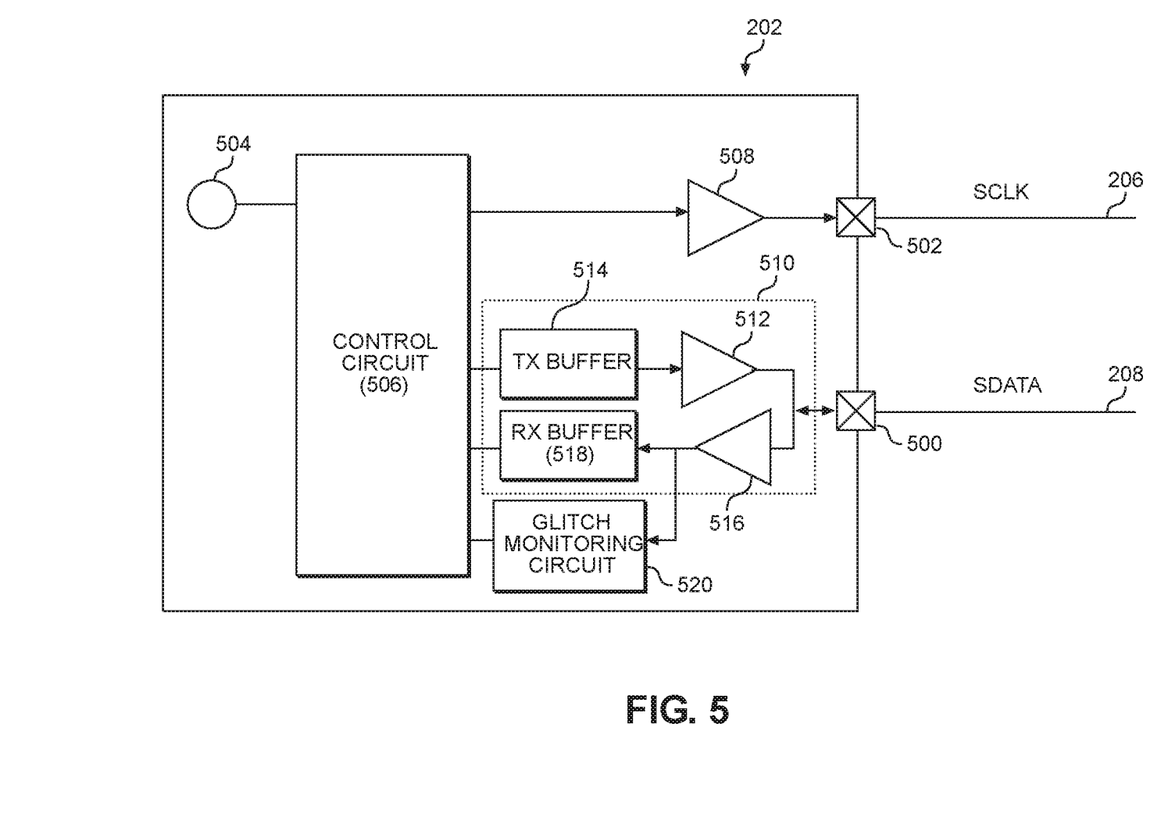
FIG. 5 is a block diagram of a host or master RFFE device with a glitch monitoring circuit according to an exemplary aspect of the present disclosure.

In this regard, FIG. 5 illustrates a block diagram of a host or master IC 202. The master IC 202 may include a data port 500 configured to be coupled to the data line 208 and a clock port 502 configured to be coupled to the clock line 206. For example, the ports 500 and 502 may be pins in the master IC 202. Such pins may sometimes be referred to as a means for coupling as in a means to couple to a communication bus or means to couple to a line (e.g., the data line 208 or the clock line 206). The master IC 202 may include a clock source 504 or receive a clock signal that originates outside the master IC 202. A control circuit 506 may receive and/or manipulate the clock signal before outputting SCLK to an amplifier 508 coupled to the clock port 502. A transceiver 510 is coupled to the data port 500 and is configured to send and receive data on the data line 208. In particular, the transceiver 510 may include a transmitter amplifier 512 that amplifies data stored in a transmit (TX) buffer 514 before sending the data as the SDATA signal on the data line 208. Likewise, received data on the data line 208 is amplified by a receiver amplifier 516 before being stored in a receive (RX) buffer 518. The transceiver 510 includes at least a means for transmitting (e.g., the transmitter amplifier 512) and a means for receiving (e.g., the receiver amplifier 516). Transmitted and received data may be generated or manipulated by the control circuit 506 as is well understood. Exemplary aspects of the present disclosure are provided by a glitch monitoring circuit 520 that monitors voltage or current levels received at the data port 500. In particular, a comparator circuit (not shown) within the glitch monitoring circuit 520 may compare voltage or current levels to a threshold as well as compare to a contemporaneous level of SCLK to determine if a glitch or noise event has occurred and how the noise event aligns with the logical highs and lows of SCLK (i.e., is the noise event entirely within a logical low such that the noise event looks like a possible SSC signal).

If the glitch monitoring circuit 520 detects a glitch or noise event that could appear as an SSC signal, the glitch monitoring circuit 520 may inform the control circuit 506 for ameliorative action.

Figure 6:
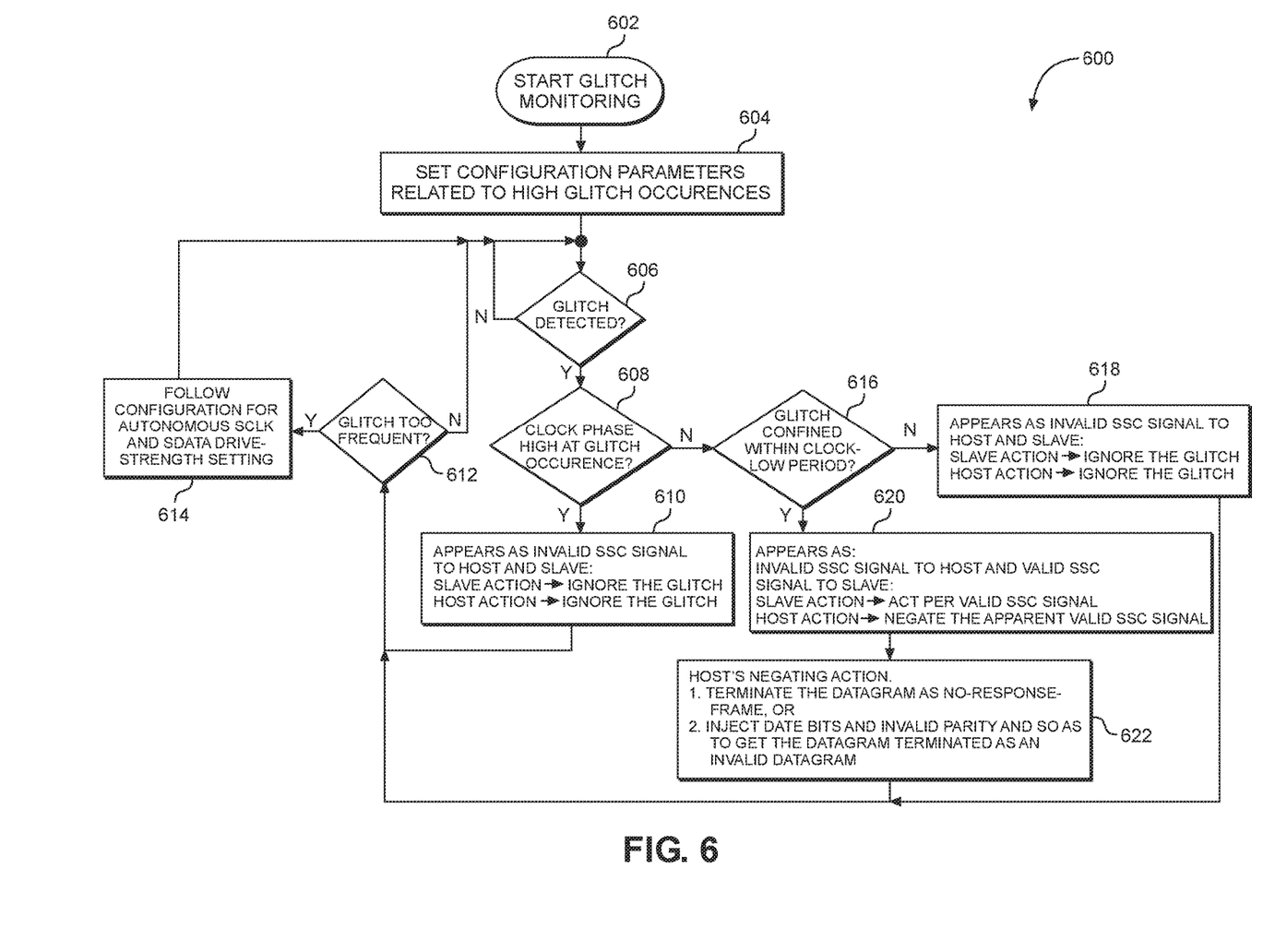
FIG. 6 is a flowchart illustrating a process for detecting a crosstalk-caused glitch and providing signaling on the data line to ameliorate the crosstalk in such a manner that slaves in the RFFE system do not interpret the glitch as an SSC signal.

In this regard, exemplary aspects of the present disclosure contemplate a process 600 illustrated in FIG. 6. The process 600 begins by the glitch monitoring circuit 520 starting to monitor glitches (block 602) on the data line 208. The control circuit 506 may set configuration parameters related to high glitch occurrences (block 604). These configurations may include a clock frequency, a threshold level, a duration, and the like. Based on the configuration parameters, the glitch monitoring circuit 520 detects glitches (block 606). If no glitch is detected, the process 600 continues to monitor. If however, a glitch is detected, the glitch monitoring circuit 520 determines if the clock phase is high at the glitch occurrence (block 608) (i.e., is SCLK at a logical high when the glitch occurs, e.g., line 402(2) or line 402(3)).

If the answer to block 608 is yes, then the glitch monitoring circuit 520 concludes that the glitch appears as an invalid SSC signal to the host and slave and both the host and slave ignore the glitch (block 610) without further action by the host. The glitch monitoring circuit 520 may determine if glitches are occurring more frequently than a predefined threshold (block 612). If the answer to block 612 is no, then the process 600 returns to monitoring at block 606. If, however, the glitches are too frequent, then modifications may be made to adjust SCLK and SDATA drive-strength settings (block 614). For example, if glitches are occurring too frequently, then the voltage levels on the clock line 206 may be reduced while keeping the same frequency, the frequency may be modified if the slaves can handle different frequencies without compromising performance, or the data line 208 may be strongly driven to a logical low instead of being weakly held at the logical low. This strong driving of the data line 208 may be timed to coincide with the logical highs or the transitions of SCLK rather than hold it constantly at a logical low. Still other modifications may be made as needed or desired.

With continued reference to FIG. 6, if the answer at block 608 is that no, the glitch did not occur at a high clock phase, the glitch monitoring circuit 520 then determines if the glitch is confined to a clock-low period (block 616). If the answer to block 616 is no, the glitch extends outside a clock-low period (e.g., line 402(5)), then the glitch monitoring circuit 520 concludes that the glitch appears to be an invalid SSC signal, and both the host and the slave ignore the glitch (block 618). The process 600 then moves to block 612 described above.

If, however, the answer to block 616 is yes, the glitch is confined (e.g., line 402(4)), then the glitch monitoring circuit 520 concludes that the glitch appears as an invalid SSC signal to the host 202 (because the host 202 knows it did not send an SSC signal) and appears as a valid SSC signal to the slave, so the glitch monitoring circuit 520 instructs the host to negate the apparent valid SSC signal (block 620). The control circuit 506 may then either terminate the perceived datagram (i.e., the invalid SSC signal) as a no-response-frame or may inject data bits and an invalid parity bit so that the datagram is terminated by the slaves as an invalid datagram (block 622). The process 600 continues to block 612 described above.

While the term "data" is used prolifically herein, it should be appreciated that in this context, data may include commands or the like.

The crosstalk amelioration systems and methods in a radio frequency front end (RFFE) communication system according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP)

phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. An integrated circuit (IC), comprising:
   a data port coupled to a data line of a communication bus;
   a transceiver coupled to the data port; and
   a glitch monitoring circuit coupled to the transceiver configured to:
   detect noise on the data line;
   compare the detected noise to a predefined signal type; and
   on the detected noise matching the predefined signal type, cause signals to be added to the data line causing the detected noise to appear as something other than the predefined signal type.

2. The IC of claim 1, wherein the data port comprises a pin and the communication bus comprises a radio frequency front end (RFFE) communication bus.

3. The IC of claim 2, wherein the IC is configured to operate as a host in an RFFE system.

4. The IC of claim 1, further comprising a control circuit coupled to the glitch monitoring circuit and the transceiver.

5. The IC of claim 1, wherein the transceiver comprises a transmitter and a receiver.

6. The IC of claim 1, further comprising a clock port coupled to a clock line of the communication bus.

7. The IC of claim 4, wherein the glitch monitoring circuit is configured to instruct the control circuit that the noise detected on the data line matches a sequence start command (SSC) signal.

8. The IC of claim 7, wherein the control circuit is configured to drive the data port with the transceiver so as to extend a logical high through at least one logical low of a clock signal.

9. The IC of claim 7, wherein the control circuit is configured to drive the data port with the transceiver so as to inject data bits and an invalid parity bit on the data line.

10. The IC of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP)

phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player;

an automobile; a vehicle component; avionics systems; a drone; and a multicopter.

11. An integrated circuit (IC) comprising:
a means for coupling to a data line of a communication bus;
a means for transmitting coupled to the means for coupling to the data line; and
a glitch monitoring circuit coupled to the means for transmitting configured to:
detect noise on the data line;
compare the detected noise to a predefined signal type; and
on the detected noise matching the predefined signal type, cause signals to be added to the data line causing the detected noise to appear as something other than the predefined signal type.

12. A method for controlling a communication bus, comprising:
comparing a detected noise event to a clock phase;
ignoring the detected noise event when the detected noise event occurs during a logical high clock phase;
determining that the detected noise event ends within a logical low clock phase when the detected noise event occurs during the logical low clock phase; and
generating a signal on a data line causing the detected noise event to appear as something other than a predefined signal type.

13. The method of claim 12, further comprising monitoring the data line of the communication bus for the detected noise event with a glitch monitoring circuit.

14. The method of claim 12, wherein the communication bus comprises a radio frequency front end (RFFE) communication bus.

15. The method of claim 12, further comprising determining that noise events occur more frequently than a predefined threshold.

16. The method of claim 15, further comprising, responsive to determining that the noise events occur more frequently than the predefined threshold, modifying a configuration parameter to reduce noise event occurrence.

17. The method of claim 16, wherein modifying the configuration parameter comprises modifying a signal level on a clock line of the communication bus.

18. The method of claim 12, wherein generating the signal on the data line comprises driving the data line to a logical high for a time period longer than the logical low clock phase.

19. The method of claim 12, wherein generating the signal on the data line comprises injecting data bits and an invalid parity bit such that the data line presents an invalid datagram.

20. The method of claim 12, wherein the predefined signal type comprises a sequence start command (SSC) signal.

21. The method of claim 12, further comprising entering a bus park cycle before comparing the detected noise event.

22. A mobile computing device comprising:
a plurality of slaves;
a two-wire communication bus comprising a clock line and a data line, the two-wire communication bus coupled to each of the plurality of slaves; and
a host comprising an integrated circuit (IC) comprising:
a data port coupled to the data line of the two-wire communication bus;
a transceiver coupled to the data port; and
a glitch monitoring circuit coupled to the transceiver configured to:
detect noise on the data line;
compare the detected noise to a predefined signal type; and
on the detected noise matching the predefined signal type, cause signals to be added to the data line causing the detected noise to appear as something other than the predefined signal type.

* * * * *